United States Patent
Kieffer

[11] B 3,913,629
[45] Oct. 21, 1975

[54] INTERPOLE LOOP CONTROL DEVICE FOR COIL WINDING MACHINES

[75] Inventor: Vernon E. Kieffer, St. Louis, Mo.

[73] Assignee: Emerson Electric Co., St. Louis, Mo.

[22] Filed: Feb. 11, 1974

[21] Appl. No.: 441,024

[44] Published under the Trial Voluntary Protest Program on January 28, 1975 as document no. B 441,024.

[52] U.S. Cl. .............................................. 140/92.1
[51] Int. Cl.² ........................................... B21F 3/04
[58] Field of Search ............. 140/92.1; 29/596, 205

[56] References Cited
UNITED STATES PATENTS

| | | | |
|---|---|---|---|
| 3,628,238 | 12/1971 | Hill | 140/92.1 |
| 3,672,040 | 6/1972 | Arnold | 140/92.1 |
| 3,714,973 | 2/1973 | Kieffer et al. | 140/92.1 |
| 3,750,718 | 8/1973 | Sedgewick | 140/92.1 |

Primary Examiner—Lowell A. Larson
Attorney, Agent, or Firm—Polster and Polster

[57] ABSTRACT

A coil winding machine is provided with interpole loop control means. The interpole loop control means is adapted to grasp the wire turn plurality of a first coil set as the next succeeding coil set is wound. The loop control means is movable reciprocally in at least two directions which enables it to engage and hold the wire turns, thereby preventing their movement. Any number of poles can be wound without the formation of interpole connecting wire loops by using the technique of grasping the turns of one coil set prior to and during the winding of the succeeding coil set.

13 Claims, 5 Drawing Figures

INTERPOLE LOOP CONTROL DEVICE FOR COIL WINDING MACHINES

BACKGROUND OF THE INVENTION

This invention relates to winding machines and in particular to a device for eliminating interpole loops between wound coil sets forming of a dynamoelectric machine.

Conventionally, a coil set defines a pole for the dynamoelectric machine and a plurality of coil sets form the winding of that machine. Each coil set may comprise one or more coil throws, individual ones of which are constructed from a plurality of individual wire turns.

Coil sets are formed on a variety of machines known in the art. One such machine is shown and described in the U.S. Pat. to Kieffer et al, Pat. No. 3,714,973, issued Feb. 6, 1973. The invention disclosed hereinafter is intended for use in conjunction with the apparatus disclosed in the Kieffer et al patent, and background information contained in Kieffer et al, U.S. Pat. No. 3,714,973 is specifically incorporated by reference herein.

Winding machines of the type disclosed in the Kieffer et al patent are designed to wind coil sets for later use in axial coil inserting devices. That is, the coil winding machines form coil sets which later are transferred to a coil insertion device or machine which inserts the prewound coils axially through the bore of a core assembly. The core assembly is constructed from a plurality of individual laminations of magnetic material joined to one another in stacked relationship by any convenient method. It is conventional to refer to the core assembly, after winding insertion, as a stator assembly. While both the winding machines and the axial coil insertion devices, as a class, work well for their intended purposes, certain inherent features of the winding and insertion method embodied in these machines hinder production rate. Thus, for example, prior art winding machines conventionally form an interpole loop between coil sets as the machine winds successive coil sets. That is, loops of magnet wire are formed which extend outwardly from the main body of wire turns. These loops must be positioned properly before the coil set can be successfully inserted by the axial insertion machine. Prior to the invention disclosed herein, the loops were moved by hand, either by the winding machine operator or by the axial inserting machine operator. In either case, the time required for repositioning the interpole loops distracts the machine operator from his primary duties and slows production.

Interpole loop formation, as indicated above, occurs because successive coil sets or poles of a dynamoelectric machine are wound oppositely one another. For example, if the wire turns of a first coil set are wound by the coil winding machine in a clockwise direction, the successive pole of the same winding is wound in a counterclockwise direction. As the winding machine reverses to wind the succeeding pole, the last wire turn of the first wound pole tends to draw away from the main body of wire turns, resulting in the objectionable interpole loop, which, as indicated above, requires repositioning prior to coil set placement on the axial insertion device.

One of the objects of this invention is to provide a device for eliminating interpole loop formation in a plurality of wound coil sets.

Another object of this invention is to provide a low cost device for eliminating interpole loops that may be used in conjunction with a coil winding apparatus.

Still another object of this invention is to provide a device for eliminating interpole loops that may be utilized over a range of coil set sizes.

A further object of this invention is to provide means for automatically eliminating interpole loops during the winding of a coil set.

Other objects will be apparent to those skilled in the art in light of the following description and accompanying drawings.

SUMMARY OF THE INVENTION

In accordance with this invention, generally stated, a coil winding machine is provided with means for controlling interpole loop formation during the coil set winding process.

In the preferred embodiment, a coil winding machine includes means for releasably grasping the most recently wound coil set upon the winding completion of that coil set. The grasping means is movable in at least two planes and is designed to ride over the outermost layer of wire, holding the wire turns on the coil set in position during the winding of the succeeding coil set.

Figure 1:
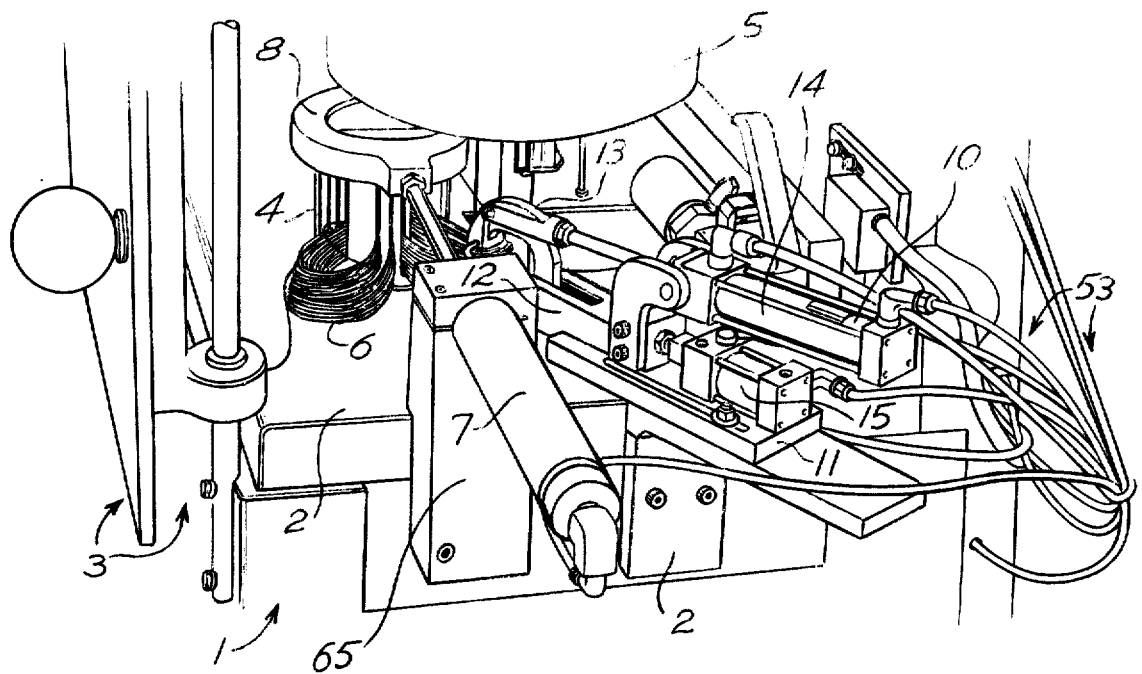
FIG. 1 is a view in perspective of a coil winding machine and loop control means of this invention, illustratively shown in a first operating position.
Figure 3:
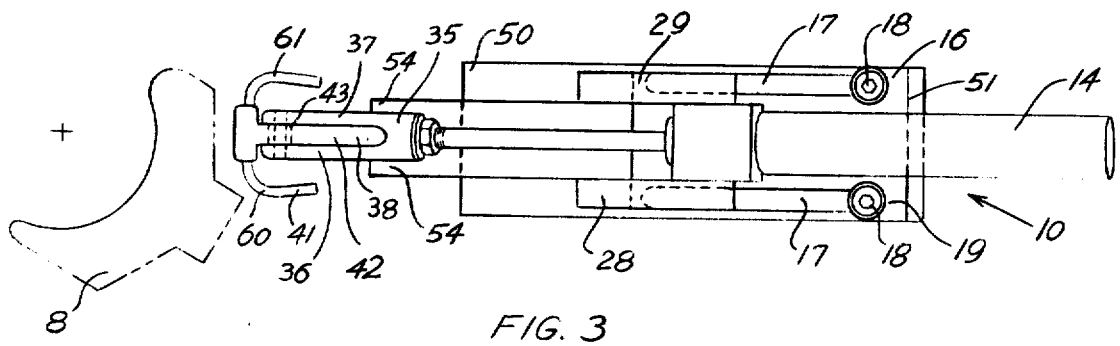
Figure 4:
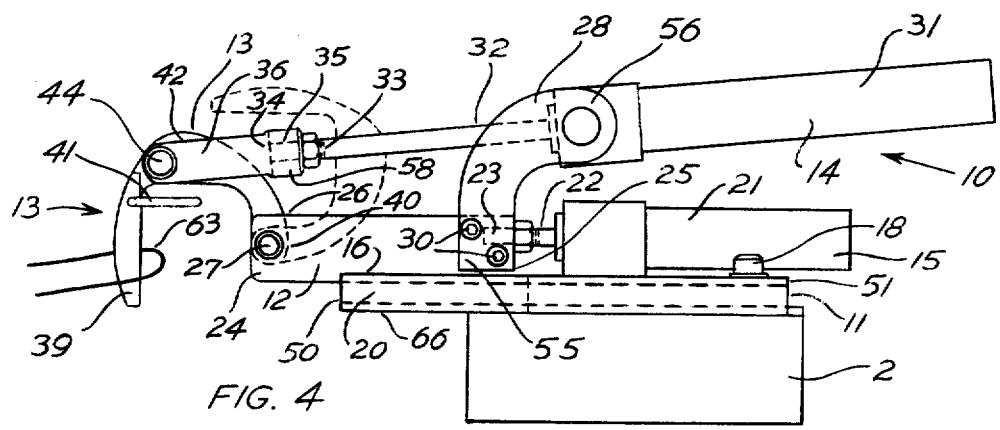

FIG. is a view in perspective of the coil winding machine and loop control means of FIG. 1, shown in a second operating position;

FIG. 3 is a top plan view of the loop control means utilized in FIG. 1;

FIG. 4 is a view in side elevation of the loop control means of FIG. 3; and

Figure 5:
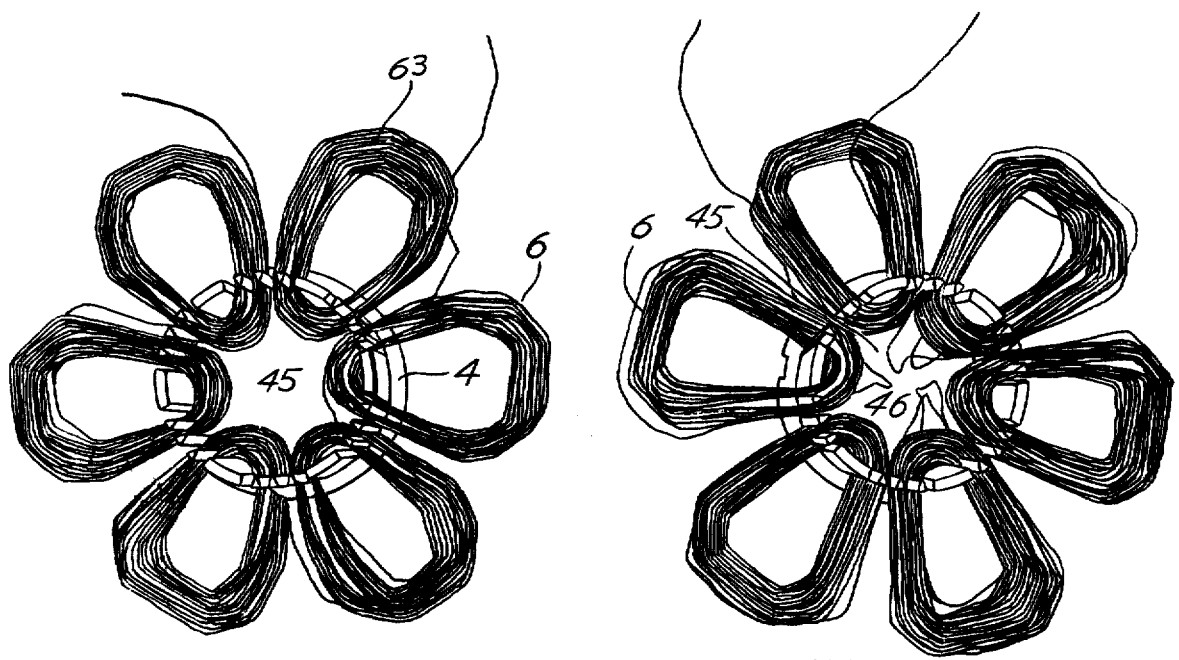

FIG. 5 is a top plan view comparing a plurality of coil sets formed with the device of this invention and a plurality of coil sets formed without benefit of the device of this invention.

DESCRIPTION OF THE PREFERRED EMBODIMENT

Referring now to FIG. 1, reference numeral 1 indicates a winding machine of the type described in the above referenced Kieffer et al U.S. Pat. No. 3,714,973. In general, the winding machine 1 has a work platform 2 attached to suitable supporting structure, generally indicated by the numeral 3. A coil storage and transfer tool 4 is removably mounted to the work platform 2. The platform 2 includes indexing means, not shown, for rotating the transfer tool 4 in predetermined increments. A winding means 5 is rotatably mounted to an upper portion of supporting structure 3, not shown. The winding means 5 winds individual reaches or turns of wire into a coil set 6.

Figure 2:
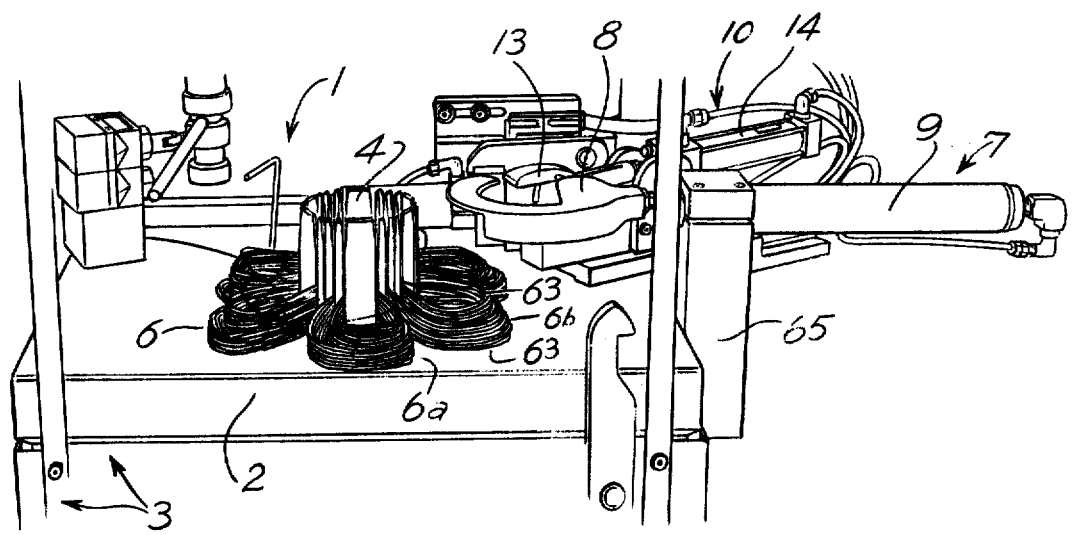

As indicated above, the coil sets 6 are conventional and an individual coil set 6 forms a pole for a stator assembly of an AC induction motor, for example. A plurality of the coil sets 6 are shown in FIG. 2. It will be understood, by those skilled in the art, that adjacent ones of the coil set 6 plurality are wound oppositely one another. That is, if the winding means 5 is rotated in a clockwise direction to wind a first coil set 6a, it is rotated in a counter clockwise direction to wind the succeeding coil set 6b.

A shroud assembly 7 is mounted to the work platform 2 along a support means 65 by any convenient method. The shroud assembly 7 includes a shroud 8 and a hydraulic cylinder 9. The shroud 8 is C-shaped in plan, the mouth of the C-shape being used to designate the portion of the coil storage and transfer tool 4 on which the coil set 6 in the process of being wound is deposited after winding completion. Operation of the winding machine 1 is substantially shown and described in the above referenced Kieffer et al patent and is not described in detail.

Also mounted to the work platform 2 is a loop control means 10. Loop control means 10 includes a support structure 11, a yoke 12, a clasp means 13, a first cylinder 14, and a second cylinder 15.

The supporting structure 11 is substantially rectangular in plan having a top surface 16 and a bottom surface 66. The structure 11 has a pair of oblong openings 17 through it, which are utilized to adjust the supporting structure 11 with respect to the work platform 2. A pair of conventional threaded fasteners 18 are sized to fit through the openings 17 and engage complimentary threaded openings, not shown, in the work platform 2. The fasteners 18 include a head 19 which is oversized diametrically with respect to the openings 17 and which adjustably clamps the supporting structure 11 to the work platform 2.

The structure 11 has an end 50 and an end 51. The end 50 has an open mouth channel 20 formed in it. The yoke 12 is slidably mounted in the channel 20. The channel 20 extends between the ends 50 and 51. Other embodiments of this invention may terminate the channel 20 at some point along the longitudinal length of the structure 11.

The cylinder 15 is mounted to the end 51 of the supporting structure 11 by any convenient method. The cylinder 15 is conventional and includes a cylinder body 21 which houses a piston rod 22. An end 23 of the rod 22 is operatively connected to the yoke 12. The cylinder 15 is connected to a source of hydraulic power, not shown, by hydraulic lines indicated generally by the numeral 53 in FIG. 1. The rod 22 is movable, in response to applied hydraulic pressure, between at least a first and second position. Movement of the rod 22 drives the yoke 12 along the channel 20.

The yoke 12 has a first end 24 and a second end 25. The end 24 has a pair of spaced, parallel arms 54 formed in it, defining a groove 26. The groove 26 is sized to receive the clasp means 13 pintle fashion. A conventional fastener 27 is inserted through suitable openings in the arms 54 and the clasp means 13 to attach the clasp means 13 to the yoke 12. The clasp means 13 is free to rotate about a centerline axis of the fastener 27.

The end 25 of the yoke 12 has a pair of supporting struts 28 and 29 respectively, attached to it by any convenient means. Common threaded fasteners 30 work well. The struts 28 and 29 are conventional. Each of the struts 28 and 29 are fixed to the yoke 12 at a first end 55 of the struts, and extend curvilinearly upwardly from the end 55 to a second, free end 56. The cylinder 14 is mounted along the struts 28 and 29 between the free ends 56. Again, mounting may be accomplished by any convenient method and conventional threaded fasteners work well.

The cylinder 14 is conventional and includes a body 31 which houses a piston rod 32. The rod 32 has a first end 33 joined to a connector 34 and a second end attached to a drive piston of the cylinder 14 within the body 31. The cylinder 14 is connected to a source of hydraulic power, not shown, by the hydraulic lines 53. The rod 32 is movable, in response to applied hydraulic pressure, between at least a first position and a second position. Operation of the rod 32 is responsible for movement of the clasp means 13.

The connector 34 is conventional in that it has a base 58 having a female receptacle 35 formed in it. Receptacle 35 is adapted to receive the end 33 of the rod 32. The receptacle 35 may be threaded and designed to engage complementary threads along the end 33 of the rod 32. The base 58 also has a pair of spaced parallel arms 36 and 37 respectively, extending outwardly from it. The arms 36 and 37 define a slot 38. The clasp means 13 is pivotally mounted to the connector 34 between the arms 36 and 37, as later described in detail.

Clasp means 13 is U-shaped device, having a first free leg 39 and a second leg 40. The leg 40 of clasp means 13 is attached to the yoke 12. The leg 39 is intended to ride over an outermost boundary layer 63 of the wire turns comprising an individual coil set 6. While the layer 63 is indicated as an upper series of wire turns, the term is intended to be generic and may indicate the bottom series of wire turns for the coil set 6 in other embodiments of this invention. A wire retaining means 41 is attached to the leg 39 and extends inwardly along the open area between the legs 39 and 40 of the U-shaped grasping means 13. Retaining means 41 is a tubular structure having a portion 60 and a portion 61 on opposite sides of the leg 39. The portions 60 and 61 may be constructed integrally or each portion may be manufactured individually and attached to the leg 39 by any convenient method. Retaining means 41 is positioned near a connecting part 42 of the clasp means 13. The connecting part 42 extends between the legs 39 and 40. Retaining means 41 is a desirable feature in certain embodiments of this invention in that it prevents individual wire turns of the coil 6 from riding above the height of the retaining means 41. While embodiments of this invention may be constructed without the retaining means 41, the extension of wire turns above the height of the retaining means 41, in embodiments not equipped with the retaining means 41 or its equivalent, may interfere with the operation of the loop control means 10.

The connecting part 42 of the U-shaped clasp means 13 is pivotally mounted between the arms 36 and 37 of the connector 34. The connecting part 42 has an opening 43 through it, which is intended to receive a fastener 44. The fastener 44 may be any conventional device that permits rotation of the clasp means 13 about a centerline axis of the opening 43, while attaching the clasp means 13 to the connector 34. As indicated above, the clasp means 13 also is pivotally mounted about the fastener 27 within the groove 26.

Simple operation and coil winding techniques are prowith the loop control means 10. As observable in FIGS. 1 and 3, loop control means 10 may be adjusted along the openings 17 so that the clasp means 13 clears the shroud 8, shown in dotted lines in FIG. 3, in the coil set 6 engaging position of the clasp 13. The loop control means 10 is utilized after an initial coil set 6 is deposited on the coil storage and transfer tool 4. The coil storage and transfer tool 4 is indexed, as described in the above-referenced Kieffer et al patent, prior to commencing the winding of the succeeding coil set. After indexing, the cylinder 15 is actuated to move the yoke along the channel 20 towards the first wound coil set 6. After the yoke 12 moves a predetermined distance, the cylinder 14 is actuated. In the embodiment illustrated, the clasp means 13 is movable between a first position shown in FIG. 2 and indicated in phantom lines in FIG. 4, and a coil set 6 engaging position shown full lined in FIGS. 1, 2 and 4, by the action of the cylinder 14. In the coil set 6 engaging position of the clasp means 13, the individual wire turns of the coil set 6 are all positioned between the legs 39 and 40, within the mouth of the U-shaped clasp means 13. The winding machine 1 then is programmed to wind the succeeding coil set 6. As previously described, the succeeding coil set 6 is wound oppositely to the preceding coil set 6. As the winding means 5 commences the rotation needed for winding the succeeding coil set 6, the last wire turn of the preceding coil set 6 is prevented from entering a bore opening area 45 of the coil storage and transfer tool 4 by the leg 39 of the clasp means 13. A plurality of coil sets 6 wound on winding machine 1 equipped with loop control means 10 are shown in the left hand portion of FIG. 5, while a plurality of coil sets 6 wound on winding machines 1 without loop control means 10 are shown in the right hand side of FIG. 5 and labelled prior art. As indicated in the last mentioned Figure number, a plurality of interpole loops 46 are formed as the winding means 5 alternates direction in forming the coil sets 6 when loop control means 10 is not used. Loop 46 formation is substantially eliminated with the use of loop control means 10.

Numerous variations, within the scope of the appended claims, will occur to those skilled in the art in light of the foregoing description and accompanying drawings. Thus, the design or placement of the loop control means 10 may be varied. While the loop control means 10 is described as being placed on an upper surface of the work platform 2, it may be placed on a lower surface of the platform 2 and a slot may be provided in the work platform 2 for operation of the clasp means 13. When placed below the platform 2, the clasp means 13 need not be pivotally mounted, but may be operated in two linear reciprocal directions, radially inwardly outwardly with respect to the transfer tool 4, for positioning the clasp means 13 with respect to the coil set 6, and upwardly downwardly with respect to the centerline axis of the transfer tool 4, for engaging the clasp means 13 with individual ones of the coil set 6 plurality. While hydraulic cylinders 14 and 15 were described, other power forms are compatible with the broader aspects of this invention. Likewise, the operational sequence of winding machines equipped with loop control means 10 may vary from that described. These variations are merely illustrative.

Having thus described the invention, what is claimed and desired to be secured by Letters Patent is:

1. In a device for winding a plurality of wire turns into at least two interconnected coil sets, each of said coil sets defining a pole for dynamoelectric machine, including means for holding each coil set after it is wound, the improvement comprising means for preventing formation of interpole loops in the interconnection between said coil sets, said loop preventing means including means for grasping the most recently wound coil set upon the completion of winding said coil set, said grasping means being movable in two planes, said grasping means holding the wire turns comprising said last mentioned coil set until at least a portion of the plurality of turns forming the next sequential coil set is wound.

2. The improvement of claim 1 wherein said grasping means includes clasp means movable between at least a first position and a second position, said clasp means being disengaged from all of said coil sets in one of said first and said second positions.

3. The improvement of claim 2 wherein said loop preventing means is further characterized by a base support structure, a yoke movably mounted to said base support structure and first power means mounted to said base and operatively connected to said yoke, said clasp means comprising a U-shaped device having first and second legs, one of said first and said second legs being rotatably mounted to said yoke.

4. The improvement of claim 3 further characterized by means for mounting second power means to said loop preventing means, said mounting means being attached to said yoke structure, and second power means attached to said mounting means and operatively connected to said clasp means.

5. A winding machine comprising:
a supporting structure;
means for receiving a coil set mounted to said supporting structure;
means for receiving and holding a wound coil set removably mounted to said supporting structure, said receiving means being adapted to receive and hold at least two of said coil sets; and
loop control means for preventing formation of interpole loops between successively wound, continuously connected ones of said coil sets, said loop control means including clasp means movably mounted to said supporting structure and power means operatively connected to said clasp means for moving said clasp means, said power means reciprocally positioning said clasp means to engage a first wound coil set while a successively wound coil set is wound by said winding means and disengaging said clasp means after the commencement of the winding of said successively wound coil set.

6. The winding machine of claim 5 wherein said loop control means is movably mounted in two planes.

7. The winding machine of claim 6 wherein said loop control means is characterized by a base mounted to said supporting structure, a yoke movably mounted to said base, first power means mounted to said base and operatively connected to said yoke, said clasp means being rotatably mounted to said yoke.

8. The winding machine of claim 7 wherein said clasp means is U-shaped, having first and second legs, one of said first and said second legs being rotatably mounted to said yoke.

9. The winding machine of claim 8 wherein said yoke structure has a first end and a second end, said first end defining a groove for receiving said clasp means therein.

10. The winding machine of claim 9 further characterized by second power means mounted to said yoke at said second end, said second power means being operatively connected to said clasp means.

11. The winding machine of claim 10 wherein said base has a channel formed in it, said yoke being carried along said channel in a slip fit.

12. A loop control device for use in a coil winding machine comprising:
- a base;
- a first structure movably mounted to said base, said first structure having a first end and a second end;
- power means mounted to said base and operatively connected to said first structure;
- means mounted to the first end of said first structure for rotation in an arcuate path; and
- second power means mounted to said first structure and operatively connected to said arcuately rotationally mounted means.

13. The device of claim 12 wherein said arcuately rotationally mounted means includes a clasp, said clasp comprising a U-shaped member having first and second legs, one of said first and second legs being rotationally mounted to said first structure.

* * * * *